United States Patent
Rushing

(10) Patent No.: US 7,908,755 B2
(45) Date of Patent: Mar. 22, 2011

(54) ADJUSTABLE ANGLE FRAMING SQUARE APPARATUS HAVING A STRAIGHT-EDGE ELEMENT WITH A TRANSLATIONAL SHIFT MECHANISM

(76) Inventor: Donald Jeffrey Rushing, Matthews, NC (US)

(*) Notice: Subject to any disclaimer, the term of this patent is extended or adjusted under 35 U.S.C. 154(b) by 146 days.

(21) Appl. No.: 12/436,372

(22) Filed: May 6, 2009

(65) Prior Publication Data

US 2010/0281702 A1    Nov. 11, 2010

(51) Int. Cl.
*B43L 7/10* (2006.01)
(52) U.S. Cl. ............ 33/465; 33/473; 33/500; 33/419
(58) Field of Classification Search .............. 33/1 R, 33/374–376, 419, 451, 452, 464, 465, 468, 33/469, 471, 473, 475, 483–485, 495–500; 403/59, 92, 93, 96
See application file for complete search history.

(56) References Cited

U.S. PATENT DOCUMENTS

| | | | | |
|---|---|---|---|---|
| 304,196 A | * | 8/1884 | Hill | 33/473 |
| 706,095 A | * | 8/1902 | Oehrle | 33/342 |
| 1,034,068 A | | 7/1912 | Bley | |
| 1,242,740 A | | 10/1917 | Taylor | |
| 1,324,411 A | | 12/1919 | Rosenholm | |
| 1,740,072 A | * | 12/1929 | Cormier | 33/471 |
| 1,791,817 A | | 2/1931 | Johnston et al. | |
| 1,806,396 A | | 12/1931 | Hartwell | |
| 2,412,084 A | * | 12/1946 | Gieske | 33/419 |
| 3,832,782 A | | 9/1974 | Johnson et al. | |
| 4,144,650 A | | 3/1979 | Rawlings et al. | |
| 4,267,642 A | * | 5/1981 | Stapleford | 33/473 |
| 4,327,501 A | | 5/1982 | Hunt | |
| 4,481,720 A | | 11/1984 | Sury | |
| 4,562,649 A | | 1/1986 | Ciavarella | |
| 4,745,689 A | | 5/1988 | Hiltz | |
| 5,233,760 A | | 8/1993 | Patterson | |
| 5,452,522 A | | 9/1995 | Kook et al. | |
| 5,519,942 A | * | 5/1996 | Webb | 33/290 |
| 5,586,395 A | | 12/1996 | Malczewski | |
| 5,675,901 A | | 10/1997 | Young | |
| 5,713,135 A | | 2/1998 | Acopulos | |
| 5,839,201 A | | 11/1998 | Young | |
| 6,102,479 A | * | 8/2000 | Wallace | 297/357 |
| 6,122,834 A | | 9/2000 | Rester | |
| 6,134,795 A | | 10/2000 | Hitchcock | |
| 6,543,144 B1 | | 4/2003 | Morin | |
| 6,742,271 B1 | | 6/2004 | Rushing | |

* cited by examiner

*Primary Examiner* — Amy Cohen Johnson
(74) *Attorney, Agent, or Firm* — F. Rhett Brockington

(57) ABSTRACT

An embodiment is an articulating straight-edge apparatus having an asymmetrical hub with a lobe having a flat edge. The hub has a bearing hole, an axle, a circular side with recesses which provide stopping at pre-set angles. There is a secant slotted channel through the lobe. The floor of the channel has depressions that provide stopping for translational shift. A connecting block is covered with a back and front plate. The block has an angle positioning SLD. The SLD impinges recesses as the hub is rotated. Additionally, there is a translational shift mechanism which includes a sliding rail in the channel. The rail has a SLD aligned to impinge a depression as the rail moves through the channel, therein stopping at a depression. Attached to the siding rail is a straight-edge element. The straight-edge serves as a carpenter's square, and can be adjusted angularly and translationally with manual force.

20 Claims, 11 Drawing Sheets

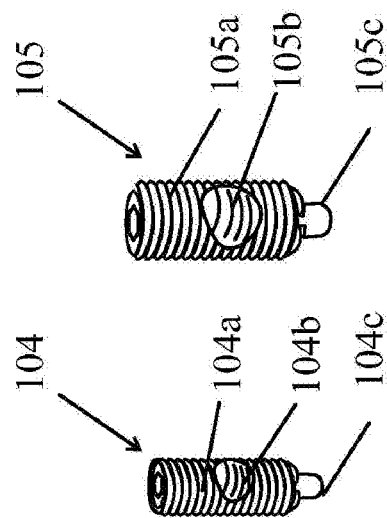
FIG. 12
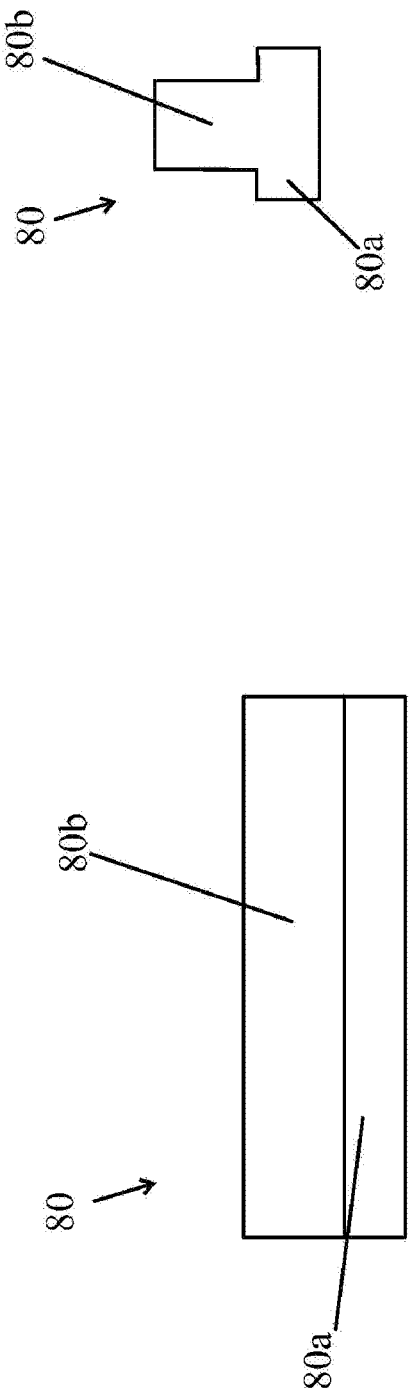
FIG. 13
FIG. 14
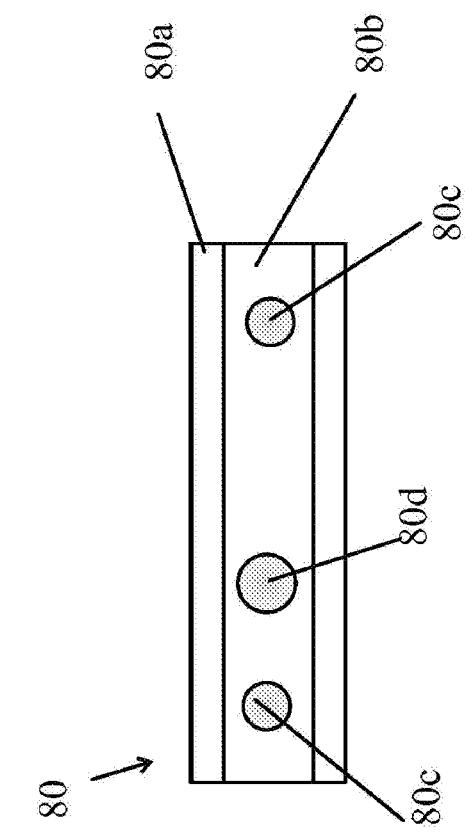
FIG. 17

US 7,908,755 B2

ADJUSTABLE ANGLE FRAMING SQUARE APPARATUS HAVING A STRAIGHT-EDGE ELEMENT WITH A TRANSLATIONAL SHIFT MECHANISM

FIELD OF THE INVENTION

The present invention relates generally to levels and framing squares, and more particularly to an adjustable angle framing square apparatus that can be fitted to a level, where the apparatus has a straight-edge element with a translational shift mechanism.

BACKGROUND OF THE INVENTION

Framing squares and levels are utilized in construction, and in particular in masonry, carpentry and plumbing to a lesser extent. In carpentry framing squares and levels are used separately and in combination to ensure that framing elements such as studs, rafters or joists are level, square, properly angled, and plumb. Masonry construction requires similar measurements, but in contrast to framing, masonry construction utilizes smaller individual elements such as bricks, stones, and blocks; and the tools are sized appropriately. A level fitted with a square has the advantage that both tools are readily available, and they complement each other. For instance, in a masonry project where a wall is being built on a concrete footing, a bubble level can first determine that the footing is level, and then as bricks are laid the square is used to determine that the bricks are properly aligned with respect to each other and with respect to the footing. As several layers of brick are laid a level fitted with a square ensures that adjustments are made to maintain alignment of the bricks. A criterion for a successful combination level—framing square is that neither interferes with the performance of the other. For example, the fitted framing square cannot interfere with the requirement that the level has at least one flat surface. If, in use, a straight-edge of the framing square sometimes breaks the plane of the flat surface of the level, then the combination apparatus will no longer be as useful. Likewise, if the level prevents a user from marking or checking an angle then the combination apparatus will not be as useful. A second criterion for a successful combination level—framing square is that neither component makes the combination tool more susceptible to damage. For instance, in the case of masonry which employs cement, a very alkaline substance, both components have to be constructed of materials that can withstand contact with cement. A third criterion is that the successful combination level—framing square must be relatively easy to clean, and be resistant to weathering, and especially resistant to damage by water.

SUMMARY OF THE INVENTION

The invention is an articulating straight-edge apparatus that includes a hub and a straight-edge element, where the straight-edge element has both angular and translational movement. A first aspect of the invention is that the articulating straight-edge apparatus can be fitted to a level, such as a bubble level and the like. The articulating straight-edge apparatus is resistant to wear, weathering, and environmental conditions encountered while performing masonry, plumbing, carpentry and construction in general. The invention is furthermore a combined apparatus, where a suitable level is fitted with the articulating straight-edge apparatus. A requirement for a suitable level is that it has a flat surface.

A second aspect of the invention is that the straight-edge element may be rotated to a plurality of pre-set angles (such as 30, 45, 60, 90, 135 degrees and the like) where the straight-edge element clicks into position at those angles. The angle is measured from the articulated straight-edge element to the flat surface of the level. As such, the articulating straight-edge apparatus provides a framing square, wherein the level and the framing square synergistically may be used to align and confirm that masonry work, plumbing, carpentry and construction-in-general is square, level, plumb; and that work pieces have the proper angle and orientation.

A third aspect of the invention is that the straight-edge element can be pivoted and click positioned to 180 degrees with respect to the flat surface of the level, thereby in effect extending the length of the level. For instance, a combined apparatus having a three foot level and one foot straight-edge element would serve as a four foot level when the straight-edge element is pivoted and click positioned at 180 degrees.

A fourth aspect of the invention is that the straight-edge element has a translational shift mechanism, where the translational shift is with respect to the hub. Translational shift moves the straight-edge element substantially linearly, either in-board or out-board from a starting position to a finishing position, where the straight-edge element is proximate to or in contact with an object's surface, but generally not projecting beyond the object's surface. Contact with the object's surface facilitates tracing an angle. Visual confirmation of the angle and alignment is also enhanced. The translational shift mechanism assures that the straight-edge element can be rotated such that it is substantially contiguous with an end of the level, and as previous discussed, at 180 degrees, the articulating straight-edge apparatus can be used to extend the length of the level.

An fifth aspect of the invention is that when the articulating straight-edge apparatus is fitted to a level and the like, the level can have a complementary static straight-edge bar mounted to the level, and that the static bar and rotating articulating straight-edge element can have a substantially flush fit (free of a gap), because the articulating straight-edge element has translational motion. The straight-edge element can be shifted from a position where an end of the straight-edge element actually overlaps the static bar to one that substantially abuts the static bar, so as to be substantially flush fit. The shift can be selected so that when a distal end of the straight-edge element abuts the static bar, the other proximate end is flush with an end of the level—framing square apparatus. The translational mechanism ensures that angular rotation is not impeded by impact between the end of the static bar and end distal end of the straight-edge element even though they are substantially abutted, because translational movement can prevent any impact.

A sixth aspect of the invention is that when the articulating straight-edge apparatus is fitted to a level it satisfies the three criteria for a successful combination level—framing square apparatus described in the background of the invention. That is the individual components of combination level—framing square do not negatively affect the performance of the individual components; neither component makes the combination tool more susceptible to damage; and the successful combination level—framing square must is relatively easy to clean, is resistant to weathering, and especially resistant to damage by water.

BRIEF DESCRIPTION OF THE DRAWINGS

The foregoing and other objects will become more readily apparent by referring to the following detailed description and the appended drawings in which:

FIG. 2 is also a perspective view of the articulating straight-edge apparatus that has undergone a translational shift, where the straight-edge element and the sliding rail have been slid further into the secant slotted channel revealing how a horizontal slot of the slotted channel and a base of the sliding rail are coupled. The figure also illustrates the angled corner of the back plate. The hub has an axial connection with the back plate. The back plate and the front plate (not shown) are mounted to the connecting block. The connecting block can be used to fit the articulating straight-edge apparatus to an open end of a level and the like.

FIG. 12 is an end view of the sliding rail of the translational shift mechanism, where the sliding rail slides through the secant slotted channel and joins the straight-edge element to the secant slotted channel of the hub of articulating straight-edge apparatus.

FIG. 13 is a side view of the sliding rail variously illustrated in FIG. 12, FIG. 1 and FIG. 2.

FIG. 14 is an overhead view of the sliding rail shown in FIG. 13 and FIG. 12. The larger hole receives the translational shift spring loaded device illustrated in FIG. 17.

FIG. 17 is a cut-away view of a translational shift positioning spring loaded device, and an angle positioning spring loaded device as shown in FIG. 15. The SLD includes a threaded annular element, a compression spring, a plunger for engaging a depression or recess in a surface. The selected compression spring and the selected plunger determine the force necessary to move a spring loaded device out of an engaged/stop position.

DETAILED DESCRIPTION

Figure 6:
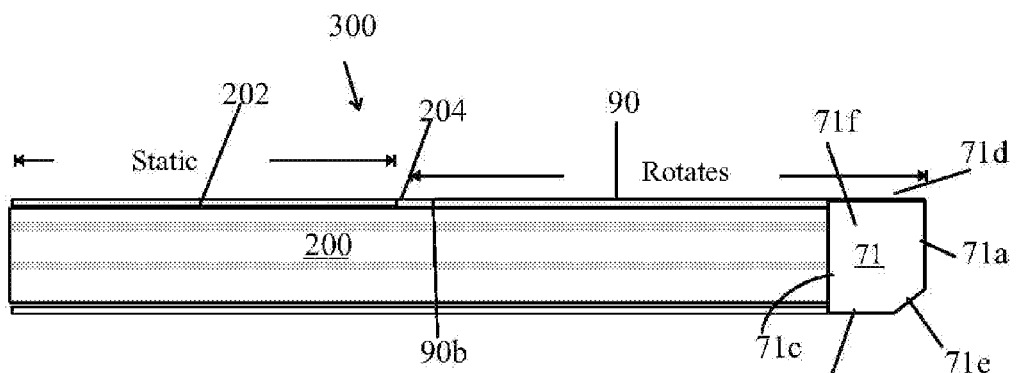
FIG. 6 is a side view of a combination apparatus having a hollow aluminum level fitted with an articulating straight-edge apparatus having a translational shift mechanism. In this view the front plate of the articulating straight-edge apparatus is shown, and the articulating element is at 0 degrees, forming a straight edge on the top of the level that is substantially contiguous along the top, except where the rotatable straight-edge element and stationary straight-edge bar meet. The straight-edge elements translationally shifted out-board (to the right), so that it does not overlap the stationary static bar. The shift simultaneously shifts the straight-edge element aligns the other proximate end with an end of the level—framing square apparatus, and this is shown in FIG. 8.

An illustrated embodiment of an articulating straight-edge apparatus 10 is shown in the attached figures. In at least one embodiment, it can be fitted to a rectangular level bubble level and the like. The illustrated level 200 has a least one hollow end that can receive the articulating straight-edge apparatus 10. The level is conventionally made of aluminum, or some other suitable material, as are most of the elements of the articulating straight-edge apparatus 10. A complete combination level—articulating straight-edge apparatus is shown in FIG. 6. In most of the other figures the front plate is removed so as to show various components and the operation of the articulating straight-edge apparatus 10.

Figure 1:
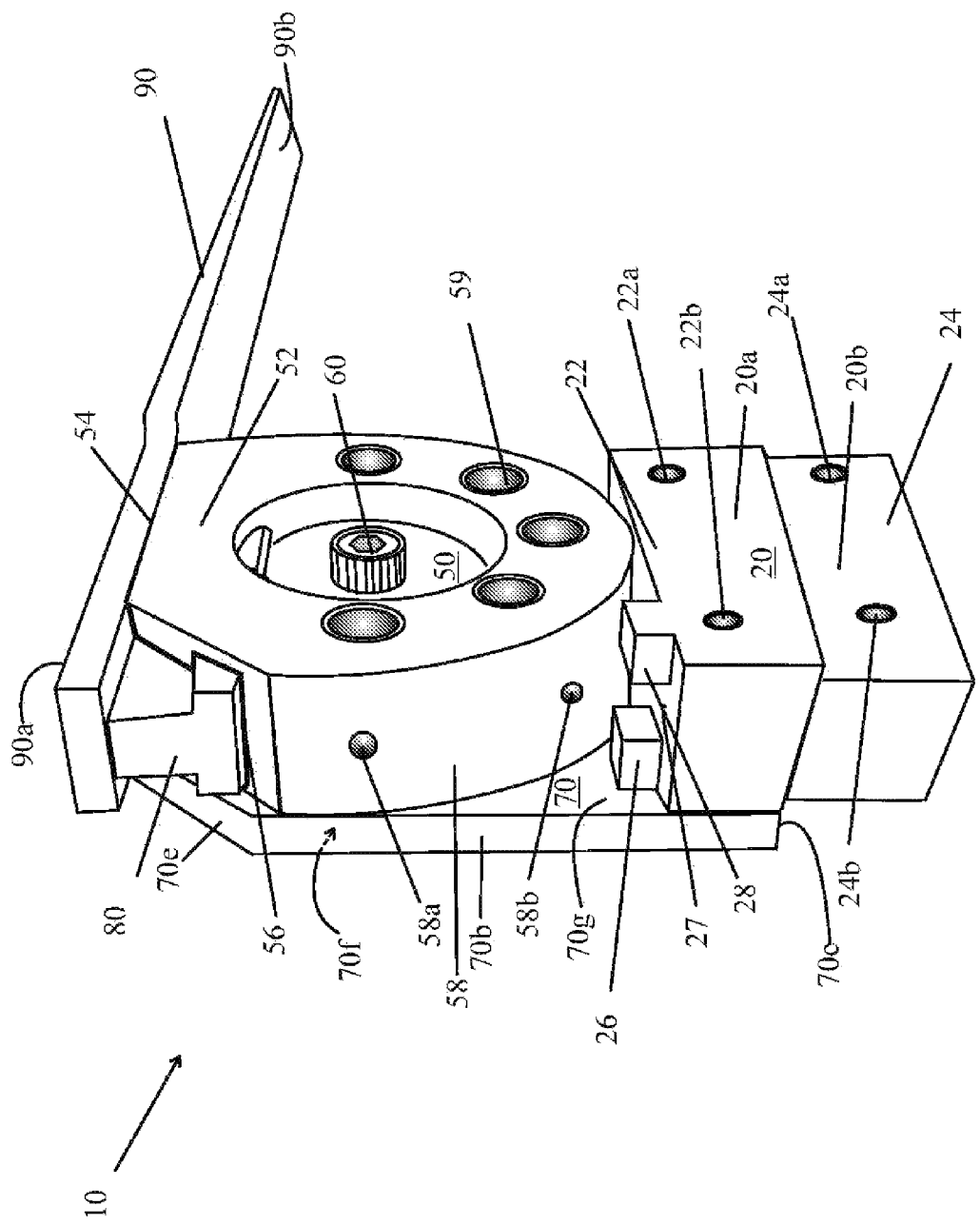
FIG. 1 is a perspective view of an articulating straight-edge apparatus with a front plate removed to illustrate that the straight-edge apparatus includes a straight-edge element directed partially into the page and an asymmetrical hub having a lobe with a flat edge. The straight-edge element is at 90 degrees. The straight-edge element is mounted on a sliding rail which can be slid through a secant slotted channel cut through the hub. The sliding rail is positioned with a spring loaded device (SLD), see FIG. 15, that intersects a depression in the floor of the secant slotted channel. The straight-edge element is supported by the upper flat edge of the hub.
Figure 15:
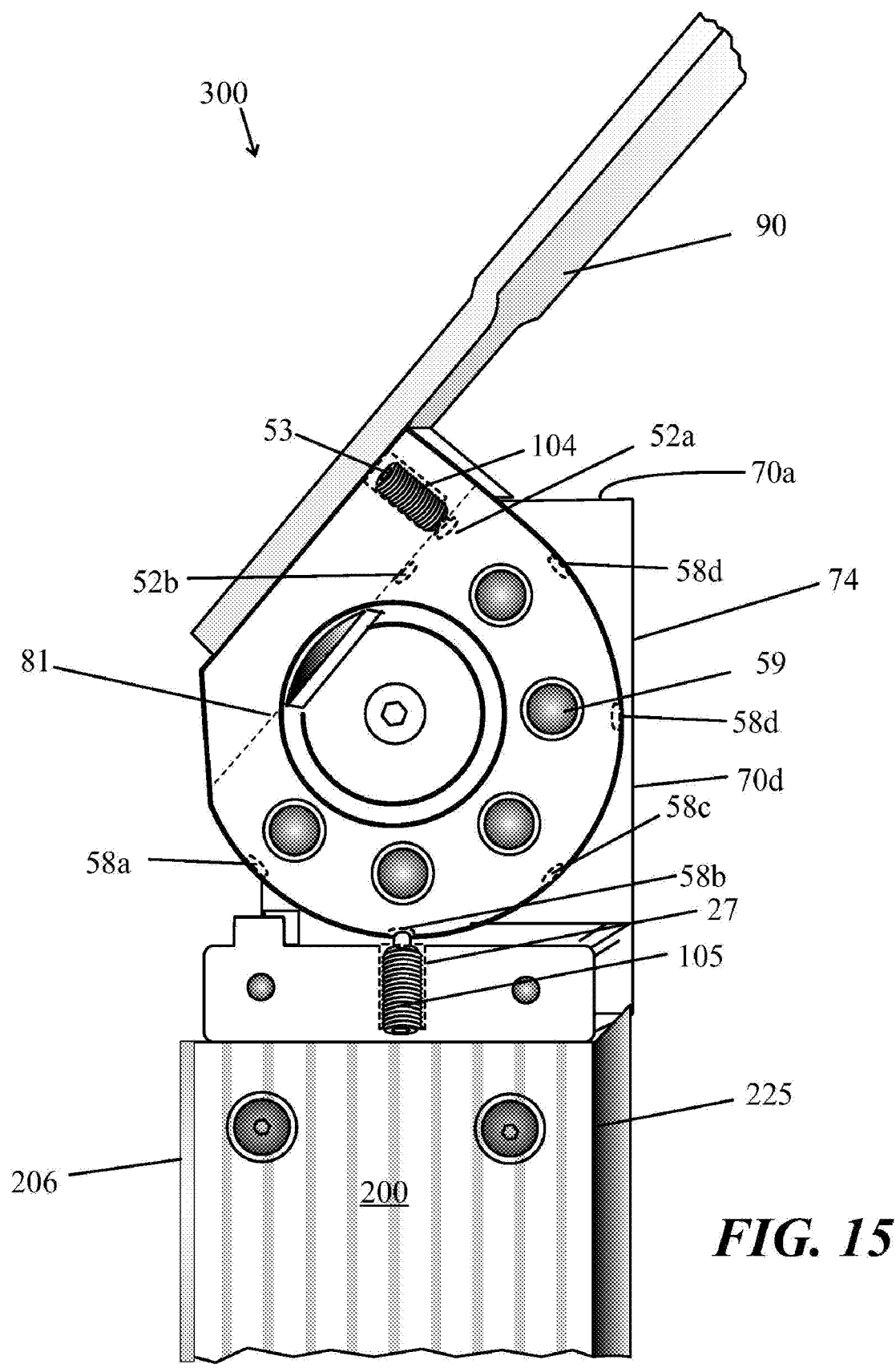
FIG. 15 is an enlarged side view of an end of a combination apparatus, where the combination apparatus includes a level fitted with an articulating straight-edge apparatus. The front plate has been removed to view the working parts. The figure diagrammatically illustrates the translational shift spring loaded devices shown in FIG. 17.
Figure 16:
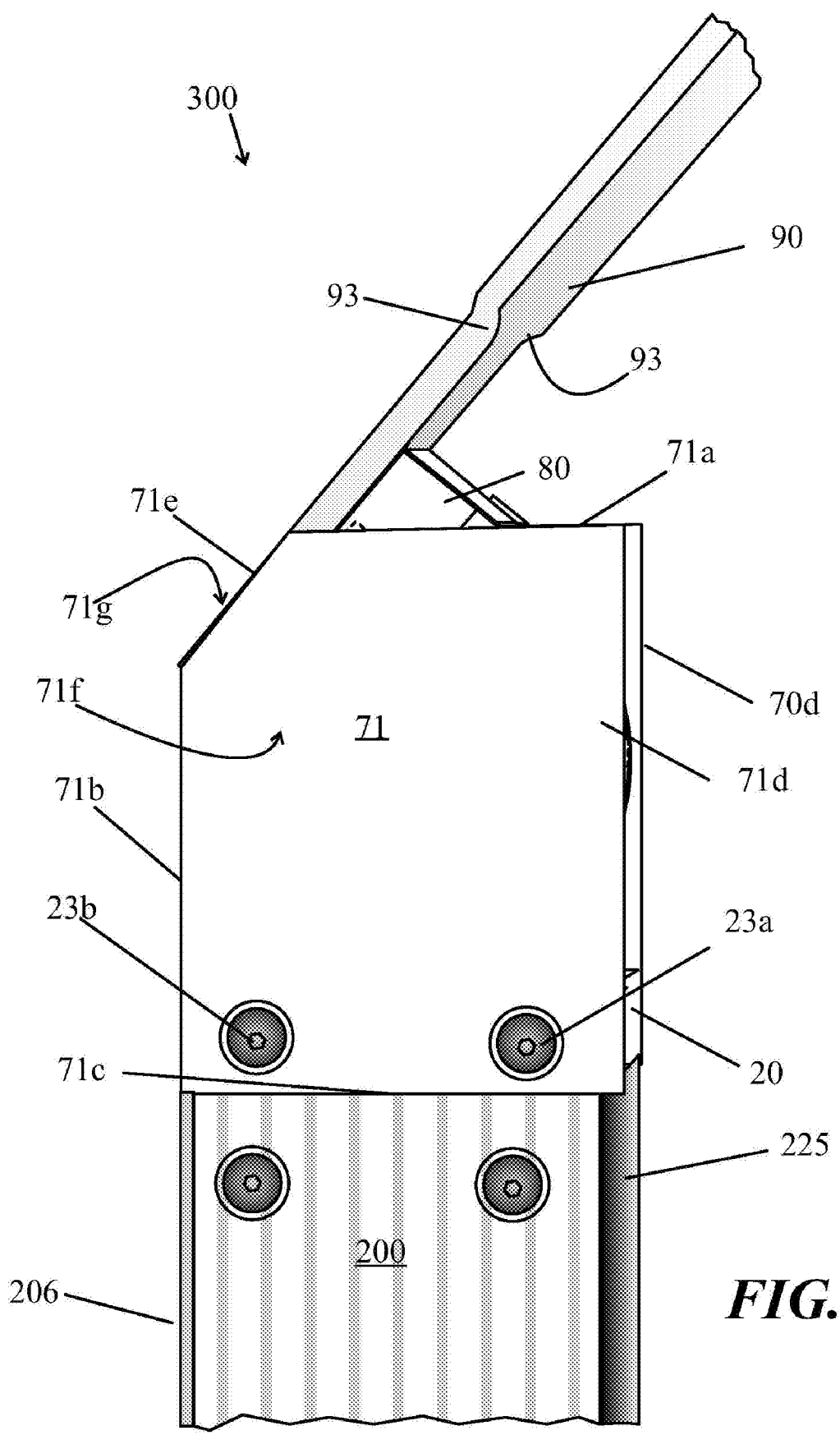
FIG. 16 is an enlarged side view of an end of the combination apparatus illustrated in FIG. 15, where the combination apparatus includes the front plate that is fastened to the connecting block with a pair of bolts.

Referring to FIG. 1, which is a perspective view of the articulating straight-edge apparatus 10 with the front plate removed and the back plate 70 attached to the connecting block 20. The connecting block 20 joins the apparatus 10 to the hollow end of a level. The bottom portion 24 of the connecting block has a pair of predrilled threaded holes 24a and 24b that align with openings on the level. A similar pair of predrilled threaded holes (not shown) are on the opposing side of the block. The front plate is attached to the connecting block 20 through holes 22a and 22b in the upper portion 22 of the connecting block. The back plate 70 is attached similarly. The back plate 70 has a plurality of sides. They include a back plate hub side 70g, an opposing back plate hub side 70f (indicated by dashed line & arrow), an end-of-level back plate side 70c, an opposing end-of-level back plate side 70a (not visible—see FIG. 6 and FIG. 15), a level flat-surface back plate side 70b, an opposing level flat-surface back plate side 70d (not visible—see FIG. 6 and FIG. 15), and an angled corner back plate side 70e. Typically, as illustrated, the upper portion 22 of the block 20 is larger that the lower portion 24, as the lower portion 24 is inserted when the apparatus 10 is connected to a level and the like. The end of the level is substantially flush with a bottom edge of the plates, as shown in FIG. 16. The connecting block 20 has a pair of protuberances 26, 28 which intersect the sliding rail 80 and the back end 90a of the articulating straight-edge element 90 when the articulating element 90 is opened to about 180 degrees. Further discussion on this follows later in the description.

The articulating straight-edge apparatus 10 has an asymmetrical hub 50 having a lobe 52 with a flat edge 54. The hub 50 has a center bearing hole and an axle 60 which mounts the asymmetrical hub 50 on the back plate 70. A circular side 58 of the hub has a plurality of recesses 58a, 58b (more not shown on rest of circular side) that establish pre-set angular stops. In one embodiment there is a recess proximate to each cylindrical void 59. A spring loaded device 104 (not shown—see FIG. 15) which is seated in the connecting block has a plunger that clicks into a selected recess (not shown—see FIG. 15) at a particular selected angle (0, 45, 90, 135, 180 degrees). Additional angular force on the articulating element overcomes the stopping force of the plunger impinged in any given recess.

The straight-edge element illustrated in FIG. 1 is at 90 degrees, where the distal end 90b is partially pointing into the page. The proximal end 90a of the straight-edge element 90a is mounted on the sliding rail 80 which can be slid through a secant slotted channel 56 cut through the hub 50. The sliding rail 56 is positioned with a spring loaded device 106 (SLD), see FIG. 15 and FIG. 12, that intersects a depression (not shown—see FIG. 15) in the floor of the secant slotted channel 56. The straight-edge element 90 is supported by the upper flat edge 54 of the hub 50.

Figure 2:
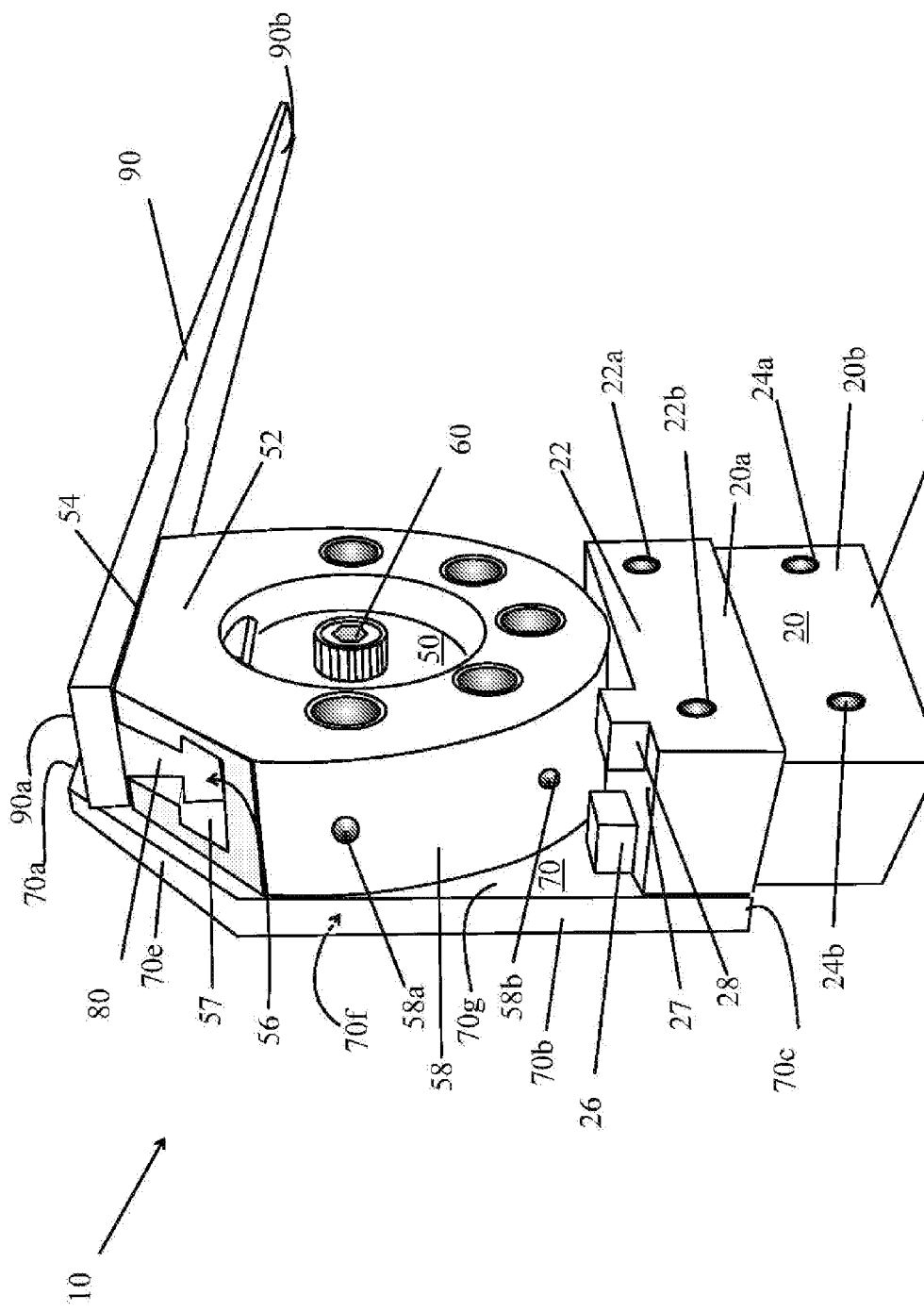

Referring to FIG. 2, the articulating straight-edge apparatus 10 has undergone a translational shift, where the straight-edge element 90 and the sliding rail 80 have been moved further into the secant slotted channel 56 revealing a portion of wall 57 of the channel 56 and the angled corner 78 of the back plate 70. The plate also has a flat-surface edge 72, a right edge 74 (as shown in FIG. 15), a bottom edge 76 and a top edge 75 (as shown in FIG. 15). The translational shift mechanism includes the secant slotted channel 56, the sliding rail 80, the depressions 120 in the floor of the secant slotted channel 56 (diagrammatically illustrated in FIG. 15), and the spring loaded device 106 (shown in FIG. 15 and FIG. 12), which has a plunger that intersects the depressions. The articulating straight-edge element 90 is attached to the sliding rail 80, so that when the sliding rail 80 moves, the straight-edge element 90 moves. Correspondingly, the translational shift mechanism is actuated by grasping the articulating straight-edge element 90, and shoving it to the desired position.

Figure 3:
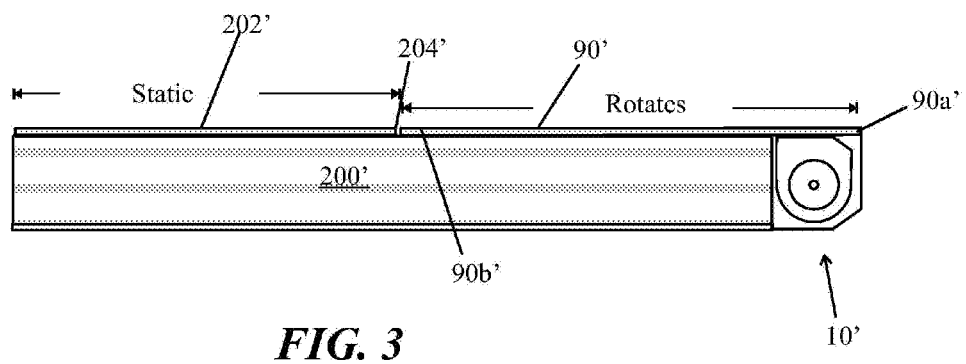
FIG. 3 is a side view of a hollow aluminum level fitted with an articulating straight-edge apparatus that does not have translational shift. In this view the articulating straight-edge apparatus is at 0 degrees, forming a straight edge on the top of the level that is substantially contiguous along the top, where the rotatable portion and stationary portion is marked with brackets. The front plate is removed.
Figure 4:
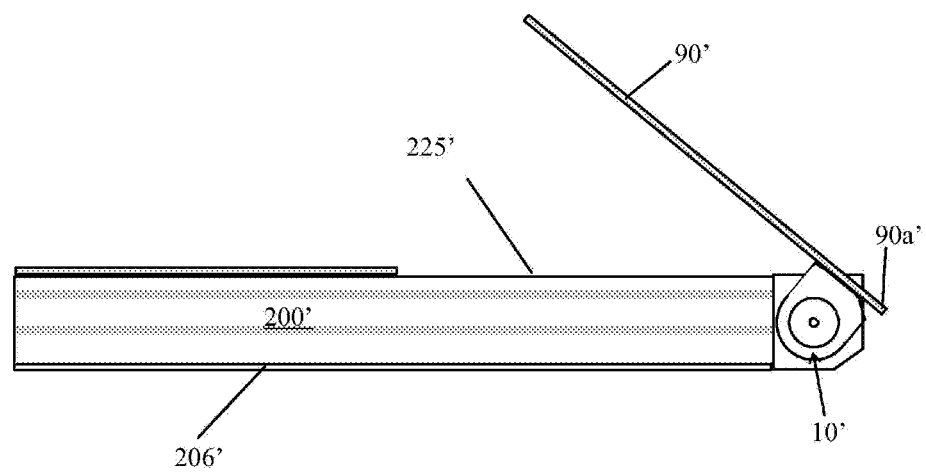
FIG. 4 is a side view of the hollow aluminum level shown in FIG. 3, where the articulating straight-edge element is rotated to 45 degrees, causing a proximal end of the straight-edge element to project beyond the back plate and the superimposed front plate (not shown). The projecting proximal end of the straight-edge element would prevent the level fitted with the articulating straight-edge apparatus from being shoved up against a vertical wall.
Figure 5:
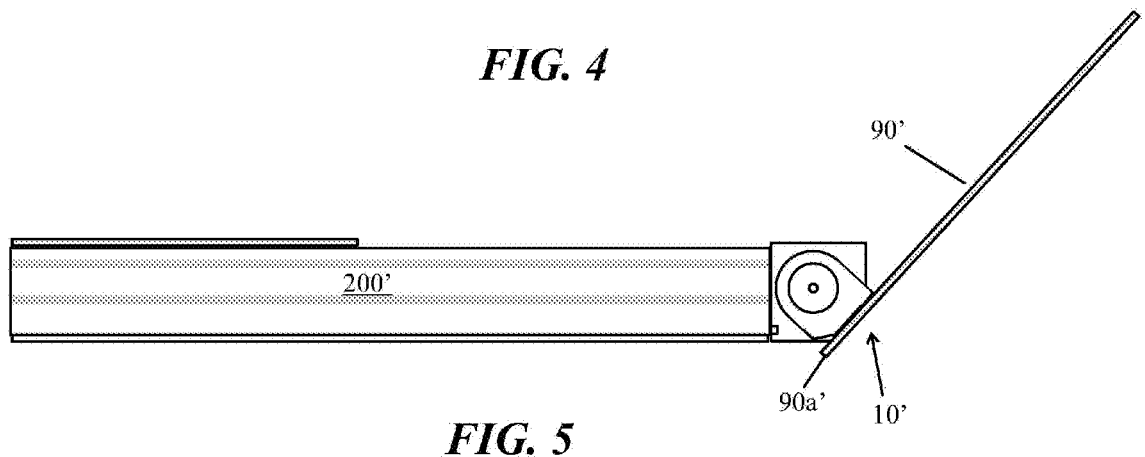
FIG. 5 is a side view of the hollow aluminum level shown in FIG. 3, where the articulating straight-edge element is rotated to 135 degrees, causing the proximal end of the straight-edge element to project below the level fitted with the back plate and the superimposed front plate (not shown). The projecting proximal end of the straight-edge element would prevent the level from laying flat.

Referring to FIGS. 3, 4 and 5, the figures illustrate a hollow aluminum level 200' fitted with an articulating straight-edge apparatus that does not have a translational shift mechanism. In FIG. 3 the articulating straight-edge apparatus 10' is at 0 degrees, forming a straight-edge bar 202' on the top of the level, where the bar has a gap 204'. The rotatable portion and static portion of the straight-edge bar 202' are marked with brackets. The rotating portion is a sectional length of the straight-edge element that overlaps the level when the angle of rotation is zero. The gap 204' is required because angular rotation causes the distal end 90b' of the straight-edge element to impinge the static portion, so enough space must be provided to clear the static portion when rotation is initiated. The thicker the straight-edge bar 202', the larger the required gap. FIG. 4 illustrates the articulating straight-edge element 90' rotated to 45 degrees, and as is evident from the drawings the proximal end 90a' of the straight-edge element 90' projects beyond the back plate and the superimposed front plate (not shown). The projecting proximal end 90a' of the straight-edge element prevents the level 200' fitted with an articulating straight-edge apparatus 10' from being shoved flush up against a vertical wall. FIG. 5 further illustrates the combination shown in FIG. 3, where the articulating straight-edge element 10' is rotated to 135 degrees, causing the proximal end 90a' of the straight-edge element to project below the level fitted with the back plate and the superimposed front plate (not shown). The projecting proximal end 90a' of the straight-edge element would prevent the level from laying flat.

Figure 8:
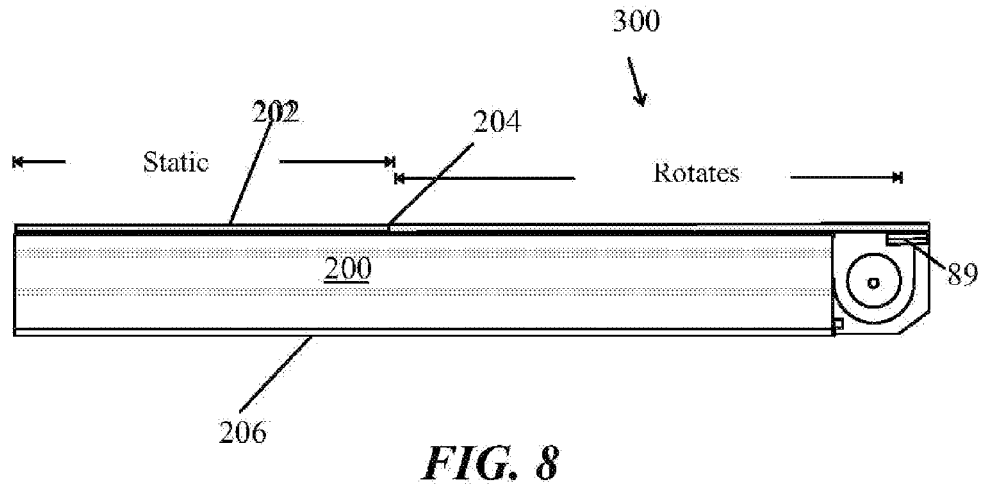
FIG. 8 is a side view of the hollow aluminum level shown in FIG. 6, where the straight-edge element has been translationally shifted out-board so there is no overlap, and there is substantially no gap.

Referring to FIG. 6, which is a side view of a combination apparatus 300 that includes a hollow aluminum level 200 fitted with an articulating straight-edge apparatus 10 that has a translational shift mechanism 89. In this view the front plate 71 of the articulating straight-edge apparatus is shown, and the articulating element is at 0 degrees, forming a straight-edge bar 202 on the top of the level, where the bar has a gap 204 that exists because the articulating straight-edge element 90 has been shifted to the right (out-board). As shown in FIG. 8, when the straight-edge element 90 is shifted to the left (in-board), the gap 204 disappears, forming a substantially contiguous bar 202. The thickness of the bar 202 has no effect on the size of the gap 204, as the straight-edge element 90 can be shifted to the right prior to rotation, and the distal end 90b will not impinge the static portion of the bar. The rotatable portion and stationary portion of the straight-edge bar 202 are marked with brackets. In an embodiment of the invention the straight-edge bar 202, which includes the straight-edge element 90, is multiple times thicker than a conventional straight-edge on a level, on the order of at least 0.125 inches thick. The straight-edge element is comprised of metal, such as aluminum or an alloy of steel, having excellent strength and resistance to weathering.

Figure 7:
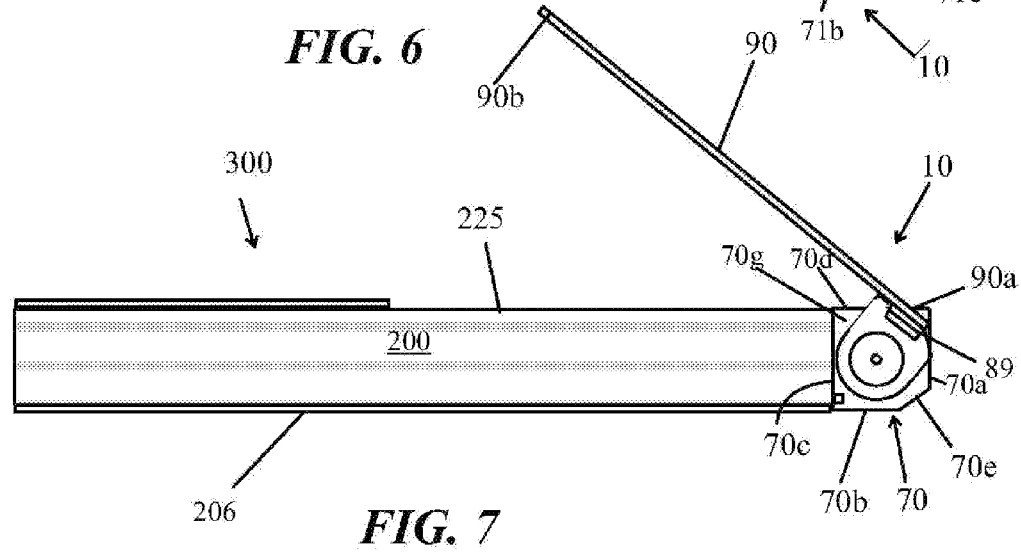
FIG. 7 is a side view of the hollow aluminum level shown in FIG. 6, where the articulating straight-edge element is rotated to 45 degrees and translationally shifted in-board so that the proximal end of the straight-edge element is substantially flush with the back plate and the superimposed front plate (not shown). The back plate has a plurality of sides. They include a hub side (front), an opposing hub side (back), an end-of-level side (left), an opposing end-of-level side (right), a level flat-surface side (bottom), an opposing level flat-surface side (top), and an angled corner side (oblique side).

Referring to FIG. 7, which is the combination apparatus 300 shown in FIG. 6, where the articulating straight-edge element 90 is rotated to 45 degrees and translationally shifted in-board so that the proximal end of the straight-edge element is substantially flush with the back plate 70 and the superimposed front plate 71 (not shown).

Referring to FIG. 8, which is the combination apparatus 300 shown in FIG. 6, where the straight-edge element has been translationally shifted, thereby eliminating the gap 204 that existed prior to the shift.

Figure 9:
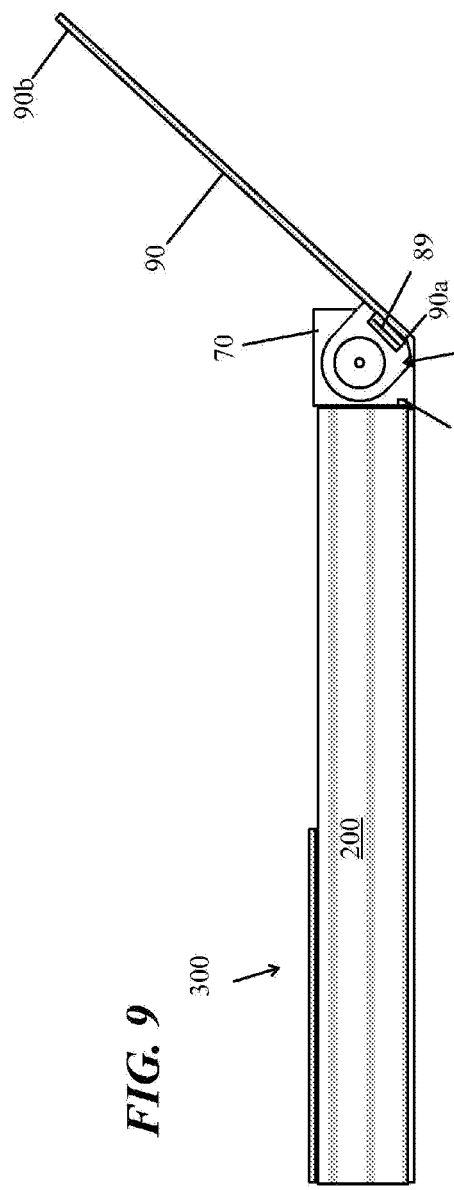
FIG. 9 is a side view of the hollow aluminum level shown in FIG. 6, where the articulating straight-edge element is rotated to 135 degrees and translationally shifted in-board so that the proximal end of the straight-edge element is substantially flush with the back plate and the superimposed front plate (not shown), and the projecting proximal end of the straight-edge element does not prevent the level from laying flat.

Referring to FIG. 9, which is the combination apparatus 300 shown in FIG. 6, where the articulating straight-edge element 90 is rotated to 135 degrees and translationally shifted in-board so that the proximal end 90b of the straight-edge element is substantially flush with the back plate 70 and the superimposed front plate (not shown), and the projecting proximal end of the straight-edge element 90 does not prevent the level from laying flat.

Figure 10:
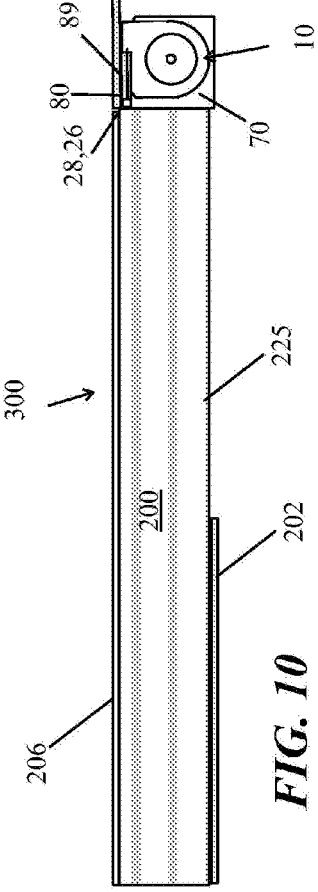
FIG. 10 is a side view of the combination apparatus, inverted from view shown in FIG. 6, where the articulating straight-edge element is rotated to 180 degrees and translationally shifted in-board so that the proximal end of the straight-edge element and the sliding rail intersect the twin protuberances arising from the connecting block. An upper surface of the straight-edge element is substantially coextensive with the level's flat surface (which also serves as a level straight-edge. The spaced twin protuberances in the connecting block assure that the straight-edge element is well supported, and cannot rotate out-of position. Typically, the combination apparatus would be used with the twin protuberances on the upper-side, as illustrated.

Referring to FIG. 10, which is the combination apparatus 300 shown in FIG. 6, where the articulating straight-edge element 90 is rotated to 180 degrees and translationally shifted out-board so that the proximal end of the straight-edge element 90 and the sliding rail 80 intersect the twin protuberances 26, 28 arising from the connecting block 20 (see FIG. 1 and FIG. 2). An upper surface of the straight-edge element is substantially coextensive with the level's smooth-edge 206. The spaced twin protuberances in the connecting block assure that the straight-edge element is well supported, and cannot rotate out-of position. The protuberances are sized and separated by a space wide enough to receive the sliding rail, and the protuberances support the substantially square end of the proximate portion of the straight-edge element and also prevent the straight-edge element from opening beyond an angle of 180 degrees. Typically, the combination apparatus 300 would be used with twin protuberances on the upper-side, as illustrated.

Figure 11:
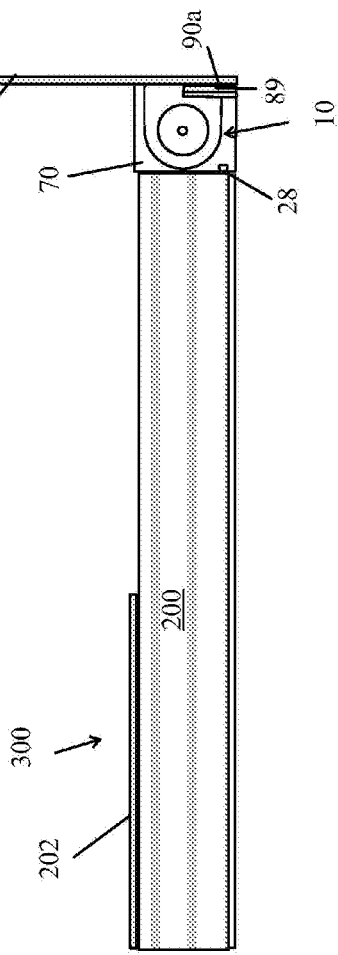
FIG. 11 is a side view of the hollow aluminum level shown in FIG. 6, where the articulating straight-edge element is rotated to 90 degrees and translationally shifted so that the proximal end of the straight-edge element is substantially flush with the back plate and the superimposed front plate (not shown), and the projecting proximal end of the straight-edge element does not prevent the level from laying flat. The thickness of the translational shift mechanism and mounted articulating straight-edge element is sized to occlude the angled corner of the front plate and back plate, therein producing a normal right angle.

Referring to FIG. 11, which is the combination apparatus 300 shown in FIG. 6, where the articulating straight-edge element 90 is rotated to 90 degrees and translationally shifted in-board so that the proximal end 90a of the straight-edge element is substantially flush with the back plate 70 and the superimposed front plate (not shown), and the projecting proximal end of the straight-edge element does not prevent the level from laying flat.

Referring to FIG. 12, which is an end view of the sliding rail 80, which slides through the secant slotted channel 56. In addition to aluminum, it is anticipated that other metals, metal alloys and engineering plastics, such Delrin, may be suitable materials for some or all components of the invention. Delrin, a nylon, is mentioned specifically because certain grades have a low coefficient of friction. Delrin® is a registered trademark of DuPont.

Referring to FIG. 13 and FIG. 14, the sliding rail 80 shown in FIG. 12 is shaped somewhat like an inverted block T, so as to couple with the secant slotted channel. It has a base 80a and a trunk 80b, where the trunk 80b has threaded holes 80c and the like for fastening the proximal portion 90a of the articulating straight-edge element 90 to the trunk 80b of the sliding rail 80, and a hole 80d that receives the spring loaded device 104 (SLD).

Referring to FIG. 14, the larger hole 80d receives the SLD 104, and after it is positioned, the proximate end 90a of the articulating element 90 is fastened to the sliding rail 80. Typically the articulating element 90 is fastened after the sliding rail 80 is positioned in the secant slotted channel 56 cut through the hub 50.

Referring to FIG. 15, the level 200 of the combination apparatus 300 is fitted with an articulating straight-edge apparatus 90, where the front plate is removed to illustrate diagrammatically how the angle positioning spring loaded device 105 (SLD) engages the hub at preset angles. The plunger of 105 SLD intersects the recesses (58a-58d) in the circular side 58 of the hub 50. The recesses are also shown in FIG. 1. The translational shift positioning spring loaded device 104 (SLD is also shown. It engages depressions 52a, 52b in the floor 82 of the secant slotted channel 56. The floor 81 is indicated by the dashed line.

Referring to FIG. 16, which is an enlarged side view of an end of the combination apparatus 300 that includes a level 200 and an articulating straight-edge apparatus 10, where the front plate 71 is fastened with a pair of bolts 23a, 23b to the connecting block 20. The level 200 has a level's flat-surface side 206 and opposing it is a mounting surface side 225 to which is affixed the straight-edge bar 202. The front plate 71 has a shape similar to the back plate as shown in FIG. 7. There is a plurality of sides. They include a hub side 71g (backside-not visible), an opposing hub side 71f, an end-of-level side 71c, an opposing end-of-level side 71a, a level flat-surface side 71b, an opposing level flat-surface side 71d, and an angled corner side 71e. The articulating straight-edge element 90 in this embodiment has a pair of flaring cusps 93.

The opposing level flat-surface side 71d is substantially coextensive with the level's flat-surface 206, and the angled corner side 71e is substantially coextensive with the straight-edge element when it is angled at 135 degrees. The back plate 70 has a similar shape and relation to the level and straight-edge element. The opposing side 225 of the level that opposes the flat-surface side 206 is slightly lower than the opposing level flat-surface side 71d of the plate 71. This provides space for the straight-edge element 90 when it is folded to the zero angle.

Referring to FIG. 17, the translational shift positioning spring loaded device 104 (SLD) as illustrated in FIG. 15, and the angle positioning spring loaded device 105 (SLD), also illustrated in FIG. 15. The SLD 104 includes a threaded annular element 104a with a compression spring 104b, a plunger 104c for engaging a depression in the floor 81 of the secant slotted channel 80 or some similar cavity. The selected compression spring 104b and the selected plunger 104c determine the force necessary to move the sliding rail 80. The plunger nominally has a rounded headed, so that it is relatively easy to translationally shift the location of the sliding rail. The SLD 105 engages the recesses in the circular wall 58 of the hub 50 and is typically, a slightly larger SLV, as it is used in the articulation. SLD 105 also includes a threaded annular element 105a with a compression spring 105b, a plunger 105c for engaging a recess in the circular side 58 of the hub 50. The selected compression spring 105b and the selected plunger 105c determine the force necessary to move the straight-edge element 90 from one angle to the next.

The front 71 plate and the back plate 70 can be marked to indicate the angle of rotation of the straight-edge element. Also, one or more sides of the straight-edge element can be marked or colored to indicate whether the translational shift mechanism is in-board or out-board.

Figure 18:
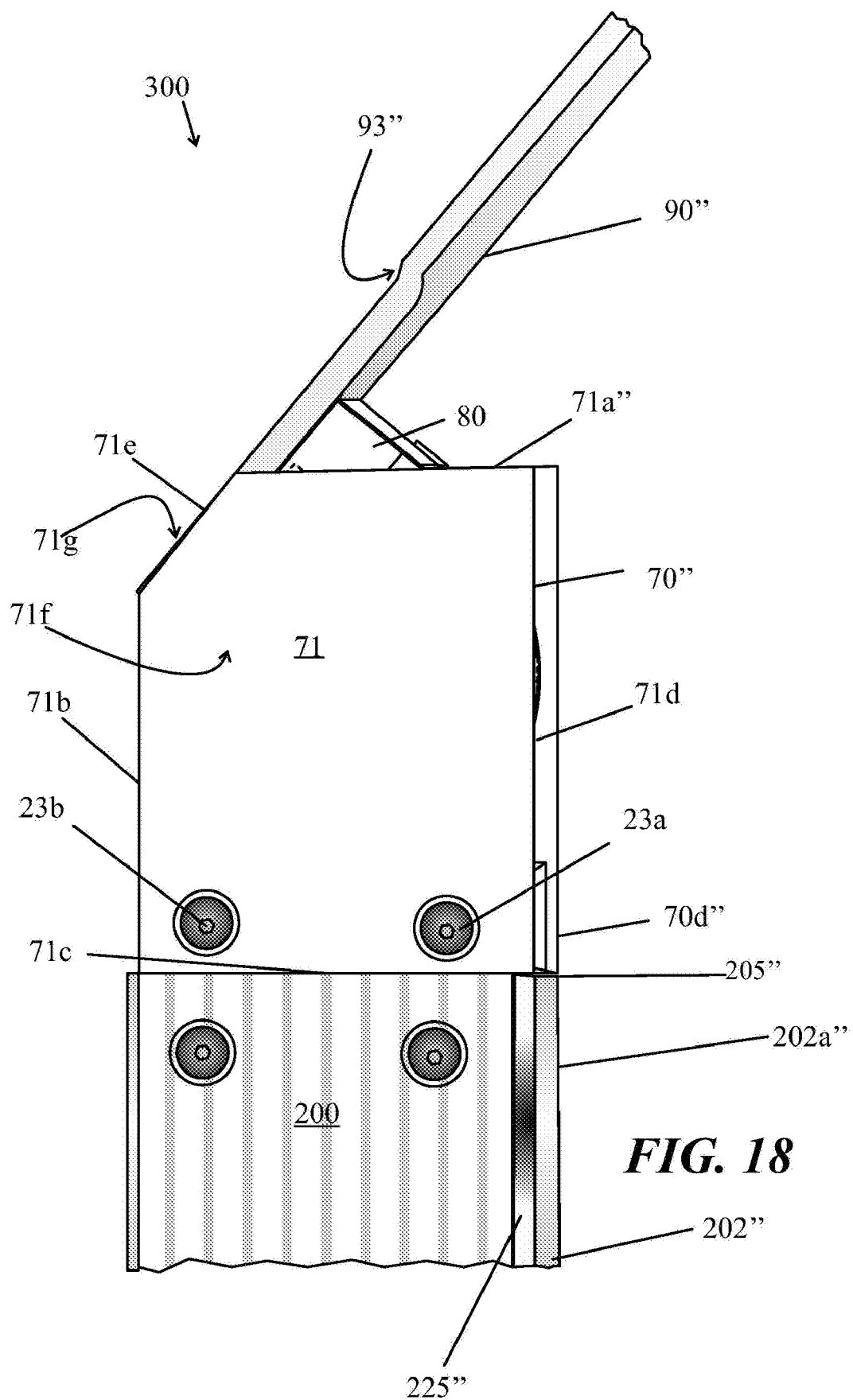
FIG. 18 is an enlarged side view of an end of an alternate embodiment of the combination apparatus, where the alternate combination apparatus has a full-length stationary straight-edge bar with a full width portion and a narrower extended portion, a narrowed articulating straight-edge element, and a plate edge with the end-of-level side bottom side substantially in abutment with the extended portion of the full-length stationary straight-edge bar. The level flat-surface side of the plate is sized such that it is aligned with the extended portion of the full-length stationary straight-edge, so that there is a substantially contiguous straight-edge formed by the plate and the bar.

Referring to FIG. 18, an alternate embodiment 300" of the combination apparatus is illustrated, which is an adjustable angle combination apparatus. As will be shown in the FIGS. 18-22, the adjustable angle combination apparatus has a full-length stationary straight-edge bar 202" with a full width portion 202b" and a narrower extended portion 202a", a narrowed articulating straight-edge element 90", and a back plate 70" with the end-of-level side bottom side 70c" (see FIG. 22) substantially in abutment with the extended portion 202a" of the full-length stationary straight-edge bar 202". The back plate 70" is slightly larger so that an edge of the plate's side 70d" is aligned with the extended portion of the full-length stationary straight-edge bar 202". Accordingly, a substantially contiguous straight-edge is formed by the plate and the full-length stationary straight-edge bar. The articulating straight-edge element 90" in this embodiment is narrowed, and has only one flaring cusp 93".

Figure 19:
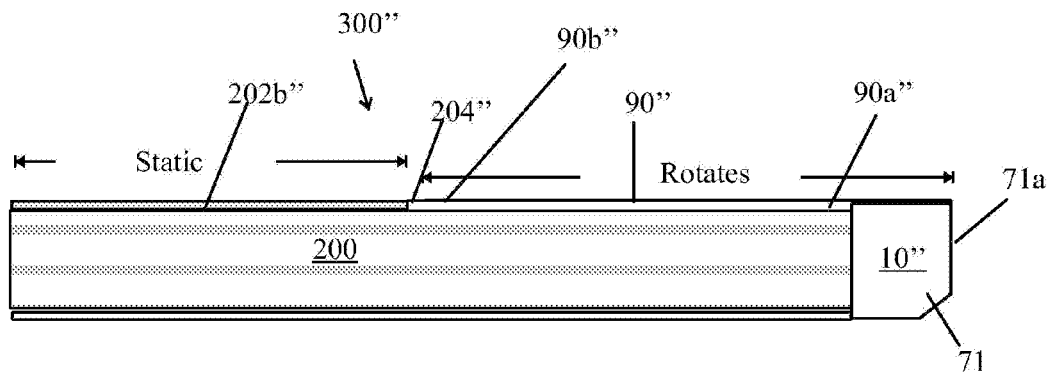
FIG. 19 is a side view of a first side of the alternate combination apparatus shown in FIG. 18, illustrating the narrowed articulating straight-edge element, and a substantially full width portion of the full-length stationary straight-edge bar. The extended portion of the bar is substantially masked from sight when the narrowed straight-edge element is at a zero angle, as is shown in this figure.

Referring to FIG. 19, the adjustable angle combination apparatus 300" has a first side, where the first side is arbitrarily designated because the front plate 71 is visible. The narrowed articulating straight-edge element 90" and the substantially full width portion 202b" of the full-length stationary straight-edge bar are illustrated. The extended portion 202a" of the bar is substantially masked from sight when the narrowed straight-edge element is at a zero angle, as is shown in this figure. The distal end 90b" of the narrowed articulating straight-edge element 90" is proximate to the full width portion 202b", such that there is a very small gap 204". The proximal end 90b" of the narrowed articulating straight-edge element 90" is moved out-board so that is substantially flush with the plate side 71a, which opposes the level end side 71c, and the translational shift positioning spring loaded device 104 (not visible—see FIG. 15) snaps into a depression. 52b (not visible—see FIG. 15) providing click position stopping at the depression. The out-board movement prevents the narrowed articulating straight-edge element 90" from overlapping the full width portion 202b", and holds element 90" in place. The translational mechanism movement produces a very small gap 204".

Figure 20:
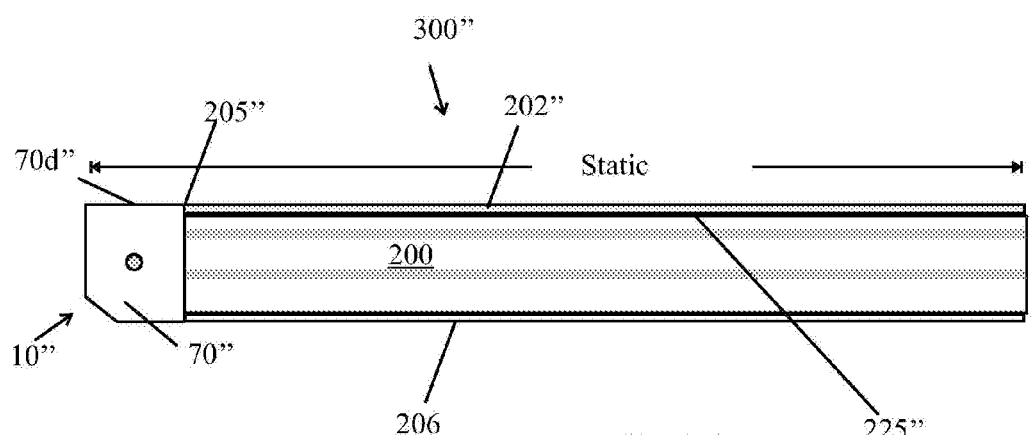
FIG. 20 is a side view of a second side of the alternate combination apparatus shown in FIG. 18, illustrating the entire length of the full-length stationary straight-edge bar with the extended portion. The bar with the extended portion is affixed to the side opposing the level's flat-surface side of the level.

Referring to FIG. 20, the adjustable angle combination apparatus 300" of FIG. 19 has a second side, where the second side is arbitrarily designated because the back plate 70" is visible. The entire length of the full-length stationary straight-edge bar with the extended portion 202" is visible. The bar with the extended portion 202" is affixed to the side 225" of the level which opposes the level's flat-surface side 206. The bar 202" abuts against the back plate 70" at intersection 205".

Figure 21:
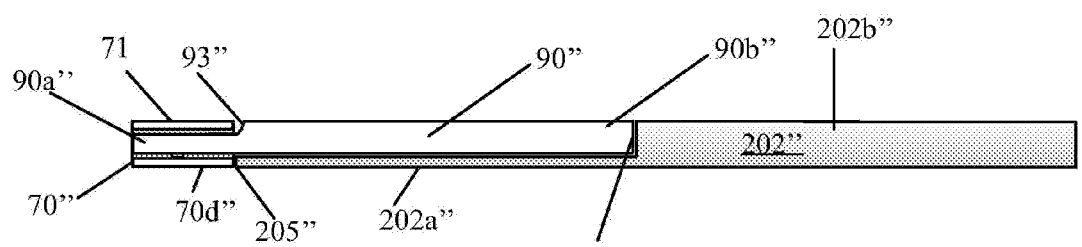
FIG. 21 is a plan view of an upper side (opposite side of the level's flat-surface side) of the alternate combination apparatus shown in FIG. 18, illustrating the narrowed articulating straight-edge element, and the full-length stationary straight-edge bar. As evident from the illustration, one side of the straight-edge element is narrowed and straight the length of the element to be on a line substantially coplanar with the extended portion therein accommodating the use of the full-length stationary straight-edge bar.

Referring to FIG. 21, the figure illustrates the narrowed articulating straight-edge element 90", and the full-length stationary straight-edge bar 202" of the adjustable angle combination apparatus 300" shown in FIG. 18. As apparent from the illustration, one side of the straight-edge element is narrowed, having only one flared cusp 93", and straight the entire length of the element. The straight length is substantially parallel to the extended portion, therein accommodating the use of the full-length stationary straight-edge bar. The extended portion of the bar 202a" abuts the back plate 70", and the intersection 205" provides a continuation of the full-length stationary straight-edge. The stationary straight-edge bar provides an adjustable angle combination apparatus that is a full length straight edge with adjustable angles.

Figure 22:
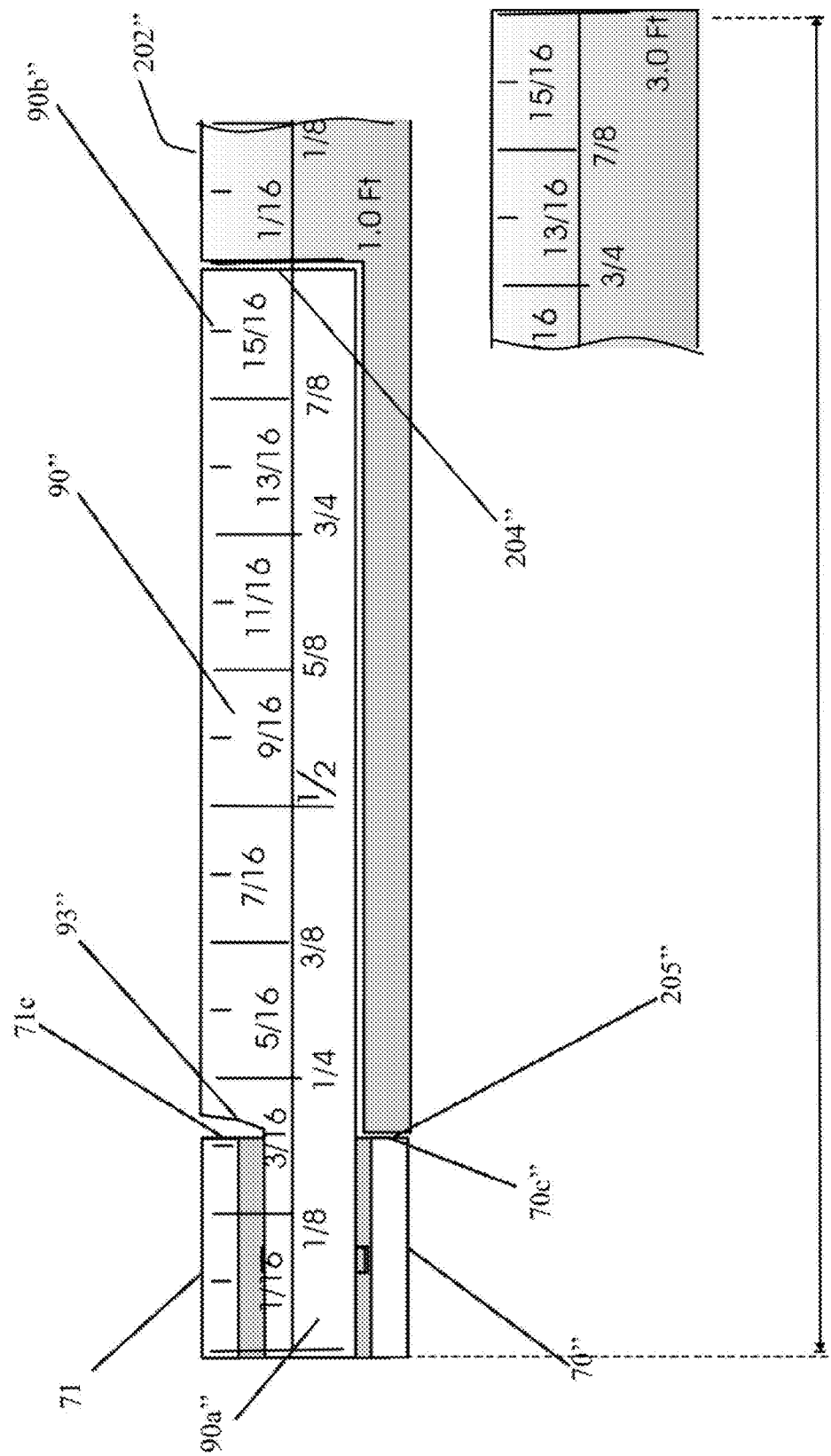
FIG. 22 is a plan view of the upper side of the alternate combination apparatus, drawn to scale for an alternate combination apparatus with a three foot level and a one foot narrowed articulating straight-edge element. The level and the articulating straight-edge element are marked with indices. In the embodiment, inches and feet are shown. The level and the articulating straight-edge element could be marked with any desired indices, such as meters and centimeters, or a combination of English and metric units, or some other convenient units such as bricks.

Referring to FIG. 22 which illustrates the use of indices on the combination apparatus and on the adjustable angle combination apparatus 300". The apparatus is drawn to scale and illustrates a three foot level and the like fitted with a one foot narrowed articulating straight-edge element. The level and the articulating straight-edge element are marked with indices. In the embodiment, inches and feet are shown. The level and the articulating straight-edge element could be marked with any desired indices, such as meters and centimeters, or a combination of English and metric units, or some other convenient units such as bricks.

Any numerical parameters set forth in the specification and attached claims are approximations (for example, by using the term "about") that may vary depending upon the desired properties sought to be obtained by the present invention. At the very least, and not as an attempt to limit the application of the doctrine of equivalents to the scope of the claims, each numerical parameter should at least be construed in light of the number of significant digits and by applying ordinary rounding.

It is to be understood that the foregoing description and specific embodiments are merely illustrative of the best mode of the invention and the principles thereof, and that various modifications and additions may be made to the apparatus by those skilled in the art, without departing from the spirit and scope of this invention, which is therefore understood to be limited only by the scope of the appended claims.

What is claimed is:

1. An articulating straight-edge apparatus, said apparatus comprising:
    an asymmetrical hub with a lobe having a flat edge, said hub comprised of: a bearing hole, an axle, a circular side with a plurality of recesses which provide click position stopping at pre-set angles, and a secant slotted channel through at least a portion of the lobe, where said slotted channel has a floor with one or more depressions which provide click position stopping for a translational shift;

a connecting block with a back plate and an angle positioning spring loaded device seated in the block and aligned to impinge a recess as the hub is rotated, therein producing angular click position stopping at a recess;

a translational shift mechanism comprising a sliding rail that is positioned in the secant slotted channel, said sliding rail having a translational shift positioning spring loaded device aligned to impinge a depression as the sliding rail moves through the secant slotted channel, therein producing translational shift click position stopping at a depression; and a straight-edge element with a length, a width and a thickness, where said straight-edge element is fastened to the sliding rail, where said straight-edge element is supported by the flat edge of the hub, and where application of manual force can cause the straight-edge element to rotate to another angle and or to shift to another position.

2. The articulating straight-edge apparatus according to claim 1, wherein said straight-edge element has a proximate portion that is nearer the hub and a distal portion that is away from the hub, where said proximate portion has a substantially square end that is mounted substantially flush with an end of the sliding rail.

3. The articulating straight-edge apparatus according to claim 2, wherein said connecting block has a pair of protuberances emanating from an upper portion of the connecting block, where said protuberances are sized and separated by a space wide enough to receive the sliding rail, and said protuberances support the substantially square end of the proximate portion of the straight-edge element and also prevent the straight-edge element from opening beyond an angle of 180 degrees.

4. The articulating straight-edge apparatus according to claim 1 further comprises a front plate, where said front plate is attached to the connecting block.

5. The articulating straight-edge apparatus according to claim 4, wherein said back plate has a plurality of sides, said sides including a hub side (front), an opposing hub side (back), an end-of-level side (left), an opposing end-of-level side (right), a level flat-surface side (bottom), an opposing level flat-surface side (top), and an angled corner side (oblique side), where the level flat-surface side is substantially coextensive with a level's flat surface side, when the articulating straight-edge apparatus is attached to an end of a level.

6. The articulating straight-edge apparatus according to claim 5, wherein said angled corner side is substantially coextensive with the straight-edge element when it is angled to 135 degrees.

7. The articulating straight-edge apparatus according to claim 6, wherein said front plate has a shape that is substantially the same as the back plate.

8. The articulating straight-edge apparatus according to claim 1, wherein said straight-edge element is at least 0.125 inches thick, and comprised of metal, such as aluminum or an alloy of steel, having excellent strength and resistance to weathering.

9. The articulating straight-edge apparatus according to claim 1, wherein said angle positioning spring loaded device has a compression spring and a plunger with a rounded head, said compression spring providing an impinging force on the plunger.

10. A combination apparatus, said combination apparatus comprised of a level with a flat surface side and an articulating straight-edge apparatus, where said articulating straight-edge apparatus comprises:

an asymmetrical hub with a lobe having a flat edge, said hub comprised of: a bearing hole, an axle, a circular side with a plurality of recesses which provide click position stopping at pre-set angles, and a secant slotted channel through at least a portion of the lobe, where said slotted channel has a floor with one or more depressions which provide click position stopping for a translational shift;

a connecting block with a back plate and an angle positioning spring loaded device seated in the block and aligned to impinge a recess as the hub is rotated, therein producing angular click position stopping at a recess;

a translational shift mechanism comprising a sliding rail that is positioned in the secant slotted channel, said sliding rail having a translational shift positioning spring loaded device aligned to impinge a depression as the sliding rail moves through the secant slotted channel, therein producing translational shift click position stopping at a depression; and a straight-edge element with a length, a width and a thickness, where said straight-edge element is fastened to the sliding rail, where said straight-edge element is supported by the flat edge of the hub, and where application of manual force can cause the straight-edge element to rotate to another angle and or to shift to another position.

11. The combination apparatus according to claim 10 further comprises a stationary straight edge bar which is affixed to a side of the level that is opposite the flat surface side of the level.

12. The combination apparatus according to claim 10, wherein said straight-edge element has a proximate portion that is nearer the hub and a distal portion that is away from the hub, where said proximate portion has a substantially square end that is mounted substantially flush with an end of the sliding rail.

13. The combination apparatus according to claim 12, wherein said connecting block has a pair of protuberances emanating from an upper portion of the connecting block, where said protuberances are sized and separated by a space wide enough to receive the sliding rail, and said protuberances support the substantially square end of the proximate portion of the straight-edge element and also prevent the straight-edge element from opening beyond an angle of 180 degrees.

14. The combination apparatus according to claim 10 further comprises a front plate, where said front plate is attached to the connecting block.

15. The combination apparatus according to claim 14, wherein said back plate back plate has a plurality of sides, including a hub side, an opposing hub side, an end-of-level side, an opposing end-of-level side, a level flat-surface side, an opposing level flat-surface side, and an angled corner side.

16. The combination apparatus according to claim 15, wherein said corner side has an edge that is substantially coextensive with the straight-edge element when it is angled to 135 degrees.

17. The combination apparatus according to claim 15, wherein said front plate has a shape that is substantially the same as the back plate.

18. The combination apparatus according to claim 10, wherein said apparatus has indices marking off length.

19. An adjustable angle combination apparatus, said adjustable angle combination apparatus comprising:

a level with a flat surface side and a stationary straight-edge bar having a full width portion and a narrower extended portion where said bar is affixed to a side of the level that is opposite the flat surface side of the level; and an articulating straight-edge apparatus, where said articulating straight-edge apparatus comprises:

an asymmetrical hub with a lobe having a flat edge, said hub comprised of: a bearing hole, an axle, a circular side with a plurality of recesses which provide click position stopping at pre-set angles, and a secant slotted channel through at least a portion of the lobe, where said slotted channel has a floor with one or more depressions which provide click position stopping for a translational shift;

a connecting block with a back plate and an angle positioning spring loaded device seated in the block and aligned to impinge a recess as the hub is rotated, therein producing angular click position stopping at a recess;

a translational shift mechanism comprising a sliding rail that is positioned in the secant slotted channel, said sliding rail having a translational shift positioning spring loaded device aligned to impinge a depression as the sliding rail moves through the secant slotted channel, therein producing translational shift click position stopping at a depression; and a narrowed straight-edge element with a length, a width and a thickness that complements and can be articulated to an angle that is substantially coextensive with the stationary straight-edge bar, where said straight-edge element is fastened to the sliding rail, where said straight-edge element is supported by the flat edge of the hub, and where application of manual force can cause the straight-edge element to rotate to another angle and or to shift to another position.

20. The adjustable angle combination apparatus according to claim 19, wherein said stationary straight-edge bar extends the full length of the level, therein providing a straight edge with adjustable angles.

* * * * *